Patented Nov. 11, 1930

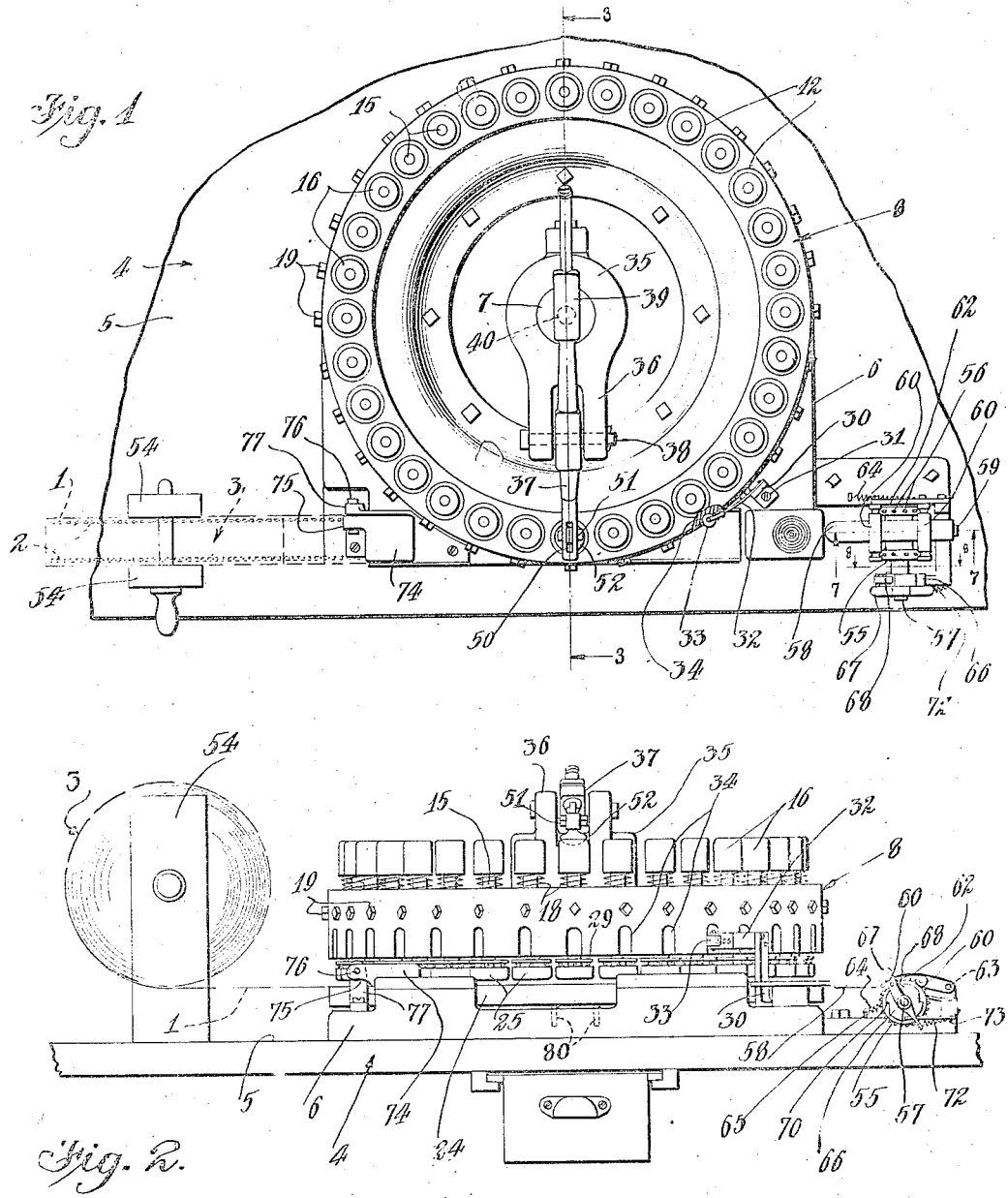

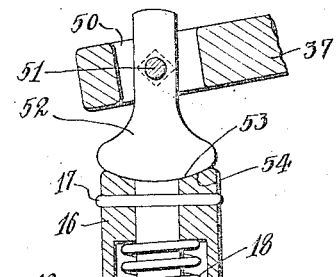
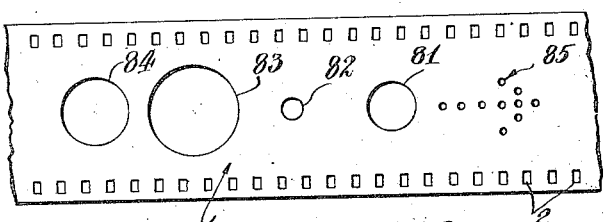
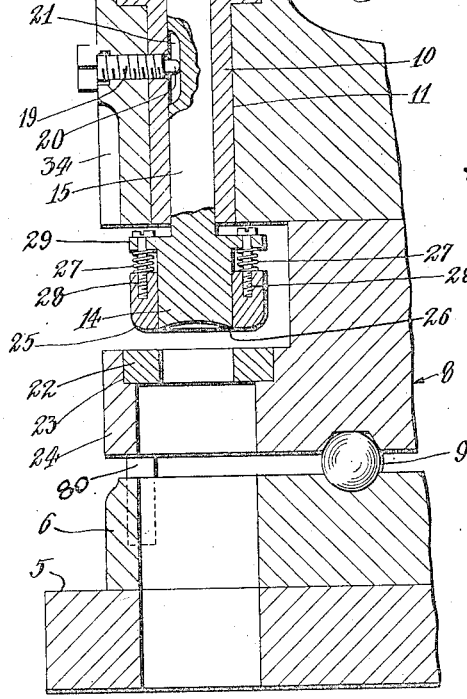
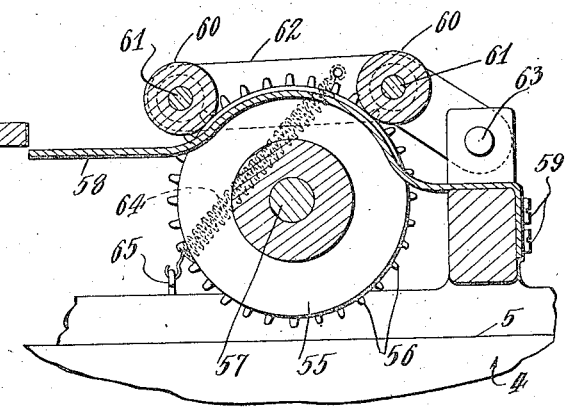
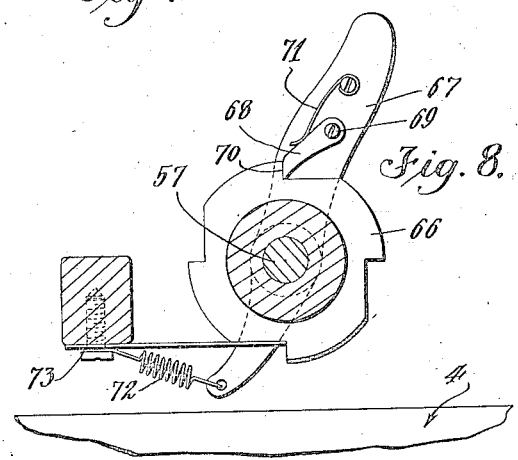
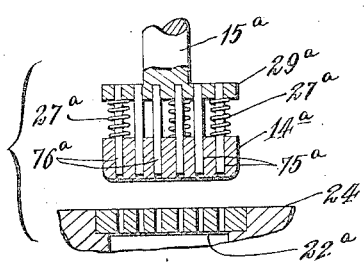

1,781,000

UNITED STATES PATENT OFFICE

LEON DE BEAULIEU, OF HOLLYWOOD, CALIFORNIA, ASSIGNOR, BY MESNE ASSIGNMENTS, TO CINEMA PATENTS COMPANY, INC., OF NEW YORK, N. Y., A CORPORATION OF NEW YORK

MEANS FOR FORMING LIGHT STRIPS FOR MOTION-PICTURE-FILM PRINTERS

Application filed March 12, 1927. Serial No. 174,989.

This invention relates to means for forming light strips for motion picture film printers.

In the printing of motion picture films in accordance with the method disclosed in and employing the film printer or battery of film printers described in the copending applications of Frederick B. Thompson, for film printer and photographic film printers, Serial Nos. 716,419 and 105,066, respectively, there is employed a light strip which has formed in it a plurality of holes or perforations of variant diameters depending, upon the light intensity desired at the point of exposure of the photographic film printer to print a certain scene on the photographic film tape.

In the production of these light strips, the size or diameters of the perforations is first calculated in accordance with the light intensity desired at the variant scenes of the photographic film tape, and the tape is caused to travel under a revolving carriage upon which there is mounted a plurality of punches for producing or punching in the tape the holes of the required diameter. The holes must be formed in definite relation to the side perforations of the strip so that the holes will align accurately in the film printing machine with the source of light and the point of exposure of the positive and negative films.

It is therefore an object of this invention to provide means for forming light strips for use in photographic film printers to produce a perforated light strip having perforations of definite predetermined and variant diameters at spaced points along its length.

Other objects and advantages of this invention will be apparent from the following detailed description of a preferred embodiment of this invention as illustrated in the drawings.

In the drawings:

Figure 1 is a top plan view of the means for forming the light strips for photographic film printers embodying this invention.

Figure 2 is a front elevation thereof.

Figure 4 is a fragmentary sectional side elevation, illustrating in enlarged detail a fragment of the carriage supporting one of the punches and the support over which the film tape is caused to travel during the formation of the perforations therein.

Figure 5 is a fragmental elevation similar to Figure 4 illustrating a modified form of punch means embodied in this invention.

Figure 6 is a plan view of a fragment of the light strip produced in accordance with this invention.

Figure 7 is an enlarged detail of the light strip drive means embodied in this invention.

Figure 8 is an enlarged fragmental view of the control mechanism embodied in this invention and operably connected with the drive means illustrated in Figure 7 for controlling the driving of the light strip during the perforation thereof so as to accurately center the light strip during the operation of the punch.

Figure 3:
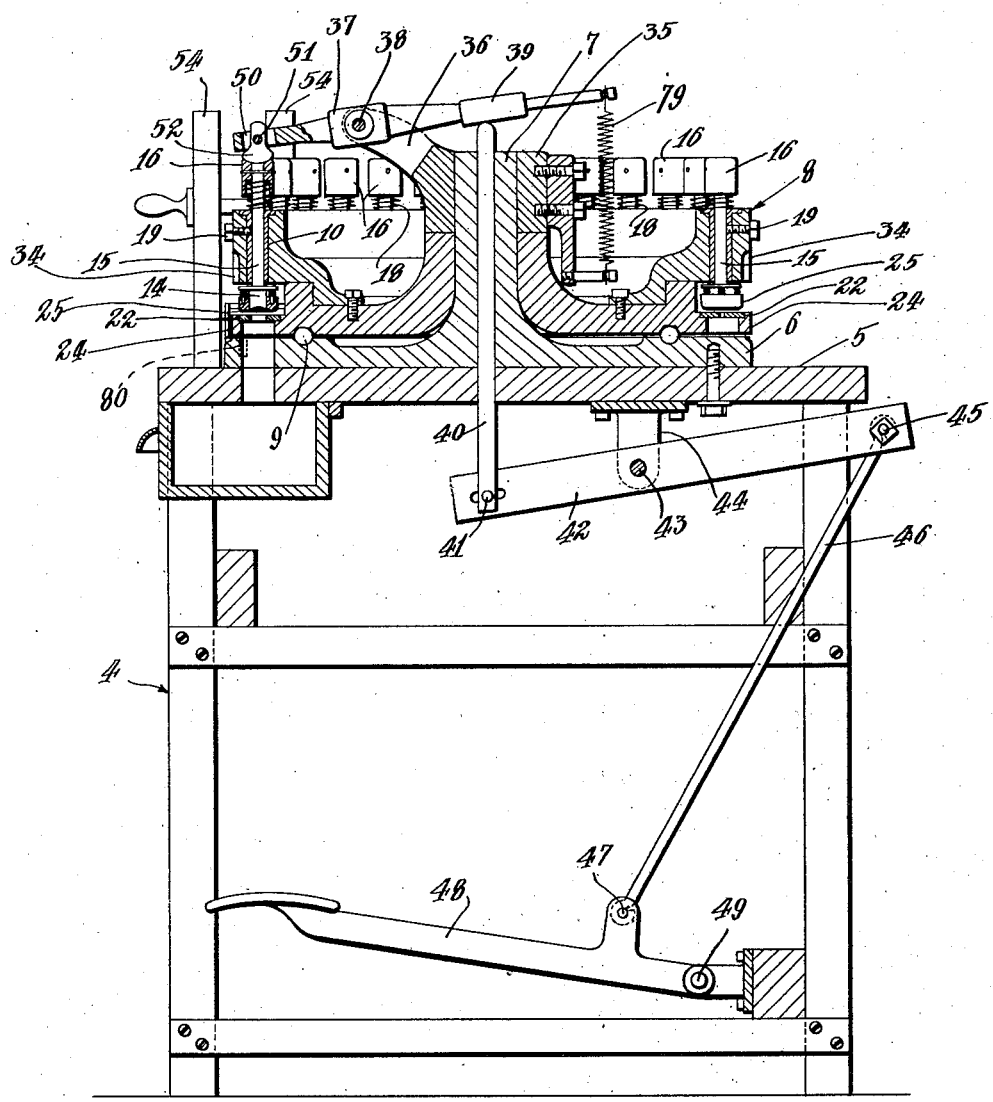
Figure 3 is a sectional side elevation thereof.

In accordance with this invention, the light strip 1 may be formed of any suitable or desirable material such, for example, of the same material as that of which the photographic film tape is constructed or of heavy paper or the like, and has the side perforations 2 formed therein similar to a positive or negative film, and is rolled on a reel 3. The light strip 1 is then positively driven over a support so that the perforations to be formed therein will be accurately positioned in the exact center of what in a positive or negative film would correspond with the frame of a single exposure or picture. The driving of the light strip is controlled so that this positive and accurate alignment is maintained for each of the holes or perforations formed and the perforations are formed by means of a punch which is mounted over a perforated punch plate. The light strip is held firmly in position during the formation of the perforations.

A frame 4 which may be of any suitable or desirable construction supports on its upper surface 5 a bearing plate 6. The bearing plate 6 has formed at its center a vertically extending trunnion 7 upon which a carriage 8 is rotatably mounted. Positioned between the bearing plate 6 and the carriage 8 is a bearing 9 upon which the carriage 8 rotates. Positioned around the periphery of the carriage 8 at spaced points are sleeves 10 which are mounted in bores 11. The sleeves 10 are formed at their upper end with annular flanges 12 which fit within recesses 13 formed in the upper surface of the carriage 8. Supported within the sleeves 10 are punches which include heads 14 which are secured to stems 15. The stems are slidably mounted in the sleeves 10 and are provided at their upper ends with caps 16 which are secured to the stems 15 by pins 17. Between the caps 16 and the flange 12 of the sleeve 10, compression springs 18 are mounted to normally hold the punch heads 14 in a raised or non-operative position. Means are provided for preventing the turning of the punch heads 14 which means preferably comprise stud bolts 19 which are screw-threaded to the carriage 8 and have their inner ends 20 extending into vertically extending slots 21 formed in the stems 15 of the punches.

Means are provided for holding the light strip 1 in position on perforated disks 22 during the punching operation, which means preferably comprise:

Mounted on the carriage 8 below each of the punch heads 14 are perforated disks 22 which are securely mounted in position in recesses 23 formed around the periphery of the lower plate 24 of the carriage 8. Slidably mounted on the heads 14 of the punches are shoes 25 which are yieldably urged to a position in advance of the cutting edges 26 of the punch heads by means of springs 27. The springs 27 are mounted upon pins 28 which are screw-threaded in the shoes 25. The pins 28 pass through bores formed in a flange 29 formed at the upper end of the head 14. Means are provided for holding the desired punch in position over the light strip, which means preferably comprise a bracket 30 which is secured to an outward extension of the bearing plate 6, as illustrated at 31. Secured to the bracket 30 is a spring steel finger 32 which carries at its opposite end a roller 33. The roller 33 engages within any one of a plurality of arcuate recesses 34 which are formed around the periphery of the carriage 8. This means of centering the carriage 8 insures that the same will be centered accurately in relation to the light strip 1 and also permits the same to be rotated easily to center the desired punch over the light strip 1.

Means are preferably provided for supporting the perforated discs 22, which means comprise a pair of pins 80 which are secured to the base 6 in position to engage the under side of the disc 22 which has been rotated to position to support the light strip 1.

Means are provided for actuating the punches, which means are preferably of the following construction:

Formed integral with the collar 35 which is mounted upon the upper end of the trunnion 7 is a yoke 36 within which an arm 37 is pivotally supported at a pin 38. The arm 37 carries an engagement block 39 in position to be engaged by a plunger 40. The plunger 40 is pivotally secured at a pin 41 to an arm 42. The arm 42 is pivotally supported at a pin 43 which passes through a bracket 44 secured to the under side of the surface plate 5 of the frame 4. Pivotally secured to the opposite end of the arm 42 at a bolt 45 is a link 46. The link 46 is pivotally secured at its opposite end at a pin 47 to an operating treadle. The treadle 48 is pivotally supported at a pin 49 to a bracket secured to the frame 4. Pivotally supported within a recess 50 formed within the end of the arm 37 at a pin 51 is a plunger engaging block 52. The plunger engaging block 52 is formed curved at its engaging surface 53 so that the same will fit within the complementary curved surface 54 of the cap 16.

Means are provided for positively driving the light strip 1 over the perforated disks 22 of the carriage 8, which means are preferably of the following construction:

The reel 3 is mounted in uprights 54 and carries a light strip 1. The reel 3 is aligned with the perforated disk 22 which is in position to receive the light strip 1, and is also aligned with a reel 55. The reel 55 has formed on its opposite flanges, teeth 56 which project into the perforations 2 formed in the edges of the light strip 1. The reel 55 is secured to a pin 57 which is supported by a bracket secured to the surface plate 5 of the frame 4.

The light strip 1 is guided onto the reel 55 by means of a flat steel guide 58 which is curved to approximate the peripheral curvature of the reel 55 and is secured in position to a vertical upright as illustrated at 59. A pair of rollers 60 are provided for holding the light strip 1 in position on the reel 55 so that the perforations 2 in the sides of the light strip 1 will be engaged with the teeth 56. The rollers 60 are pivotally supported by pins 61 carried by arms 62 which are pivotally supported at pins 63 to the upright to which the guide 58 is secured. A spring 64 is secured at one end to the arm 62 and at its opposite end to the support as illustrated at 65 and normally urges the roller 60 into engagement with the light strip 1. Secured to the pin 57 is a ratchet 66 and pivotally mounted on the pin 57 is an arm 67. The arm 67 carries a pawl 68 at the pin 69 in position to engage the teeth 70 of the ratchet 66. A spring 71 is provided for holding the pawl 68 in operative position. A spring 72 is secured at one end to the arm 67 and at its opposite end to the support as illustrated at 73.

To drive the light strip 1 the operator rotates the reels 55 by actuating the arm 67 with his finger to position the same accurately over the proper perforated disk 22. Means are provided for holding the light strip 1 down in position as the same is caused to travel over the disk 22 which means preferably comprise a weighted block 74 which is mounted in position to engage the light strip 1 and is pivotally supported by an arm 75 at a pin 76. The pin 76 passes through a bracket 77.

A spring 79 is provided for holding the engaging block 52 up to permit the carriage 8 to be freely rotated to position the punch heads 14.

The light strip 1 is by the above described means formed with a plurality of perforations 81, 82, 83, 84, etc., depending on the number of light changes required by the different scenes of the film to be printed. At the start of the light strip 1 for any particular film, an arrow 85 is formed to indicate the starting end of the light strip.

The form of punching means illustrated in Figure 5 is adapted for forming this indicating arrow and is carried by the rotary carriage 8. In this form, the punch head 14ª comprises a block through which there is formed a plurality of bores 75ª into which pins 76ª are projected. The stem 15ª is provided with an annular head 29ª to which the pins 76ª are secured. Mounted on the pins 76ª are springs 27ª which yieldably urge the punch head 14ª into position toward the complementary perforated disk 22ª.

Having fully described the preferred embodiment of my invention, it is to be understood that I do not wish to be limited to the details herein set forth, but my invention is of the scope of the appended claims.

I claim:

1. In an apparatus for forming light strips for motion picture printers, the combination of a base, a carriage mounted to rotate on the base, a plurality of punch members carried by the carriage; means of associating said base for supporting a light strip in a plane transverse with the axis of said punch members; means for arbitrarily moving said light strip in individual sections of uniform length; means for arbitrarily positioning the desired punch member over said light strip in selectively fixed position to center the punch in relation to a section of the light strip; and means for actuating the punch member.

2. In an apparatus for perforating light strips for motion picture film printers, the combination of a revolving carriage, a plurality of die plates carried by said carriage, a plurality of punches carried by said carriage and arranged coaxially with each of said die plates, means for arbitrarily conveying a light strip across one of said die plates, means for arbitrarily positioning said carriage at fixed points relative to said light strip, means operable independently of said carriage for actuating the punch positioned over the light strip and means on each punch for yieldingly holding the light strip against the respective die plate during the punching operation.

3. In an apparatus for perforating light strips for motion picture film printers, the combination of a revolving carriage, a plurality of die plates carried by said carriage, a plurality of punches carried by said carriage and arranged coaxially with each of said die plates, means for arbitrarily conveying a light strip across one of said die plates, means for arbitrarily positioning said carriage at fixed points relative to said light strip, means operable independently of said carriage for actuating the punch positioned over the light strip, means on each punch for yieldingly holding the light strip against the respective die plate during the punching operation, and means for centering said light strip relative to the axes of said punch.

4. An apparatus for perforating a light strip for motion picture film printers comprising a substantially circular revoluble carriage; a plurality of punching devices mounted on the peripheral portion of said carriage adapted to be arbitrarily fixed in position with respect to a single punching device for punching operation; means for yieldingly holding said carriage in said arbitrarily fixed position; means for arbitrarily conveying a light strip a predetermined distance through said fixed punch device; and means for actuating said arbitrarily fixed punch.

Signed at Los Angeles, California, this 16 day of Feb., 1927.

LEON DE BEAULIEU.